United States Patent
Moreno Mengibar et al.

(10) Patent No.: US 9,026,431 B1
(45) Date of Patent: May 5, 2015

(54) SEMANTIC PARSING WITH MULTIPLE PARSERS

(71) Applicant: Google Inc., Mountain View, CA (US)

(72) Inventors: Pedro J. Moreno Mengibar, Jersey City, NJ (US); Diego Melendo Casado, San Francisco, CA (US); Fadi Biadsy, New York, NY (US)

(73) Assignee: Google Inc., Mountain View, CA (US)

( * ) Notice: Subject to any disclaimer, the term of this patent is extended or adjusted under 35 U.S.C. 154(b) by 47 days.

(21) Appl. No.: 13/953,956

(22) Filed: Jul. 30, 2013

(51) Int. Cl.
G06F 17/27 (2006.01)
G06F 17/21 (2006.01)
G10L 15/26 (2006.01)
G10L 17/00 (2013.01)
G10L 15/04 (2013.01)

(52) U.S. Cl.
CPC .................................. *G06F 17/2705* (2013.01)

(58) Field of Classification Search
USPC ................ 704/235, 246, 250, 251, 252, 9, 10
See application file for complete search history.

(56) References Cited

U.S. PATENT DOCUMENTS

| | | | | |
|---|---|---|---|---|
| 5,457,768 A * | 10/1995 | Tsuboi et al. | ................ | 704/231 |
| 5,500,920 A * | 3/1996 | Kupiec | ....................... | 704/270.1 |
| 5,606,644 A * | 2/1997 | Chou et al. | .................... | 704/243 |
| 6,278,968 B1 * | 8/2001 | Franz et al. | ....................... | 704/3 |
| 6,374,217 B1 * | 4/2002 | Bellegarda | .................... | 704/240 |
| 6,374,220 B1 * | 4/2002 | Kao | .............. | 704/255 |
| 8,504,355 B2 * | 8/2013 | Ylonen | ............................. | 704/9 |
| 2001/0041978 A1 * | 11/2001 | Crespo et al. | ................. | 704/257 |
| 2002/0198713 A1 * | 12/2002 | Franz et al. | ................... | 704/252 |
| 2003/0216905 A1 * | 11/2003 | Chelba et al. | ..................... | 704/9 |
| 2004/0006465 A1 * | 1/2004 | Phillips et al. | ............... | 704/240 |
| 2004/0215449 A1 * | 10/2004 | Roy | .............................. | 704/211 |
| 2004/0243393 A1 * | 12/2004 | Wang | ............................... | 704/9 |
| 2004/0249636 A1 * | 12/2004 | Applebaum et al. | .......... | 704/231 |
| 2005/0055209 A1 * | 3/2005 | Epstein et al. | ................ | 704/255 |
| 2008/0177547 A1 * | 7/2008 | Yaman et al. | ................. | 704/257 |
| 2009/0024385 A1 * | 1/2009 | Hirsch | ............................. | 704/9 |
| 2009/0030686 A1 * | 1/2009 | Weng et al. | ................... | 704/240 |

(Continued)

OTHER PUBLICATIONS

Bohus, Dan et al., "Integrating Multiple Knowledge Sources for Utterance-Level Confidence Annotation in the CMU Communicator Spoken Dialog System," School of Computer Science, Carnegie Mello University, Nov. 2002, 29 pages.

(Continued)

*Primary Examiner* — Edgar Guerra-Erazo
(74) *Attorney, Agent, or Firm* — Fish & Richardson P.C.

(57) ABSTRACT

Methods, systems, and apparatus, including computer programs encoded on computer storage media, for semantic parsing with multiple parsers. One of the methods includes obtaining one or more transcribed prompt n-grams from a speech to text recognizer, providing the transcribed prompt n-grams to a first semantic parser that executes on the user device and accesses a first knowledge base for results responsive to the spoken prompt, providing the transcribed prompt n-grams to a second semantic parser that accesses a second knowledge base for results responsive to the spoken prompt, the first knowledge base including first data not included in the second knowledge base, receiving a result responsive to the spoken prompt from the first semantic parser or the second semantic parser, wherein the result is selected from the knowledge base associated with the semantic parser that provided the result to the user device, and performing an operation based on the result.

24 Claims, 7 Drawing Sheets

(56) References Cited

U.S. PATENT DOCUMENTS

| | | | |
|---|---|---|---|
| 2009/0067719 A1* | 3/2009 | Sridhar et al. | 382/176 |
| 2011/0161347 A1* | 6/2011 | Johnston | 707/769 |
| 2012/0215539 A1* | 8/2012 | Juneja | 704/254 |
| 2013/0325436 A1* | 12/2013 | Wang et al. | 704/9 |

OTHER PUBLICATIONS

Confidence Annotator from Olympus, downloaded from the internet on May 9, 2013, http://wiki.speech.cs.cmu.edu/olympus/index.php/Confidence_Annotator, 1 page.

Giuglea, Ana-Maria et al., "Towards Free-text Semantic Parsing: A Unified Gramework Based on FrameNet, VerbNet and PropBank," 17the European Conference on Artificial Intelligence, 2006, 8 pages.

Helios from Olypus, downloaded from the internet on May 9, 2013, http://wiki.speech.cs.cmu.edu/olympus/index.php/Helio, 2 pages.

Phoenix Server from Olympus, downloaded from the internet on May 9, 2013, http://wiki.speech.cs.cmu.edu/olympus/index.php/Phoenix, 5 pages.

"Statistical Relational Learning for NLP," Ray Mooney & Razvan Bunescu, Statistical Relational Learning, Presented by Michele Banko, downloaded from the internet on May 9, 2013, http://www.cs.washington.edu/education/courses/cse574/05sp/slides/nlp-michele.ppt, 25 pages.

Toutanova, Kristina Nikolova, "Effective Statistical Models for Syntactic and Semantic Disambiguation," A Dissertation submitted to the Department of Computer Science and the Committee on Graduate Studies of Stanford University in partial fulfillment of the requirements for the Degree of Doctor of Philosophy, Sep. 2005, 186 pages.

* cited by examiner

SEMANTIC PARSING WITH MULTIPLE PARSERS

BACKGROUND

This document relates to analyzing a prompt with multiple semantic parsers to determine the semantics of the prompt and results responsive to the prompt.

Speech recognition systems translate spoken words into text in a process that is known as automatic speech recognition. Some speech recognition systems use training where an individual speaker reads sections of text and the speech recognition system uses the terms and phrases spoken by the user to select a recognition algorithm particular to the speaker.

A semantic parser may analyze a string of n-grams according to a formal grammar to identify characteristics of the n-grams. For example, a semantic parser may analyze a sentence or a phrase to determine the syntactic relationship between the different n-grams in the sentence or the phrase.

The n-grams may be a contiguous sequence of n items from a given sequence of text. Each of the n items can be phonemes, syllables, letters, words, numerals, or base pairs to name a few examples. The value of n can vary, such as one for a unigram, two for a bi-gram, and so on.

SUMMARY

In general, one innovative aspect of the subject matter described in this specification can be embodied in methods that include the actions of receiving, at a user device, a digital representation of a spoken prompt, providing, by the user device, the digital representation of the spoken prompt to a speech to text recognizer, obtaining, by the user device, one or more transcribed prompt n-grams from the speech to text recognizer based on the digital representation of the spoken prompt, providing, by the user device, the transcribed prompt n-grams to a first semantic parser that executes on the user device and accesses a first knowledge base for results responsive to the spoken prompt, the first knowledge base stored in a memory of the user device, providing, by the user device, the transcribed prompt n-grams to a second semantic parser that accesses a second knowledge base for results responsive to the spoken prompt, the first knowledge base including first data not included in the second knowledge base, receiving, by the user device, a result responsive to the spoken prompt from the first semantic parser or the second semantic parser, wherein the result is selected from the knowledge base associated with the semantic parser that provided the result to the user device, and performing, by the user device, an operation based on the result. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. In some implementations, the speech to text recognizer executes on the user device. The second semantic parser may execute on the user device and the second knowledge base may be stored in the memory of the user device. The second semantic parser may execute on a server and the second knowledge base may be stored in one or more remote computers. The first data may comprise private user data stored in the memory of the user device and the second semantic parser does not have access to the private user data. Receiving the result responsive to the spoken prompt may comprise receiving a first result from the first semantic parser after receiving a second result from the second semantic parser, the second result selected from the second knowledge base and responsive to the spoken prompt, and performing the operation based on the result may comprise performing an operation based on the second result. The result may comprise the name of an application. The method may comprise determining, by the user device, that the application is not installed on the user device based on receiving the result from the second semantic parser. Performing the operation based on the result may comprise downloading, by the user device, the application from an application server based on determining that the application is not installed on the user device, installing, by the user device, the application, and executing, by the user device, the application.

In some implementations, the result comprises the name of an application. The method may comprise determining, by the user device, that the application is installed on the user device, wherein performing the operation based on the result comprises executing, by the user device, the application based on determining that the application is installed on the user device. Receiving the result responsive to the spoken prompt may comprise receiving, by the user device, a first result from the first semantic parser, the first result selected from the first knowledge base and responsive to the spoken prompt, and receiving, by the user device, a second result from the second semantic parser after receiving the first result, the second result selected from the second knowledge base and responsive to the spoken prompt. Performing the operation based on the result may comprise performing an operation based on the first result. Receiving the result responsive to the spoken prompt may comprise receiving, by the user device, a first result from the first semantic parser, the first result selected from the first knowledge base, responsive to the spoken prompt, and associated with a first confidence score, receiving, by the user device, a second result from the second semantic parser, the second result selected from the second knowledge base, responsive to the spoken prompt, and associated with a second confidence score, and comparing, by the user device, the first confidence score with the second confidence score to determine which confidence score is higher. Performing the operation based on the result may comprise performing an operation with a higher scoring result selected from the first result and the second result based on the comparing, the higher scoring result associated with the higher confidence score.

The subject matter described in this specification can be implemented in particular embodiments so as to realize one or more of the following advantages. In some implementations, the use of both local and remote semantic parsers allows a user device to present results to a user when a network connection is lost or there is high network latency. In some implementations, a semantic parser may determine personalized results for a user while maintaining the user's privacy and/or the confidentiality of data on a user's device. In some implementations, a local semantic parser may benefit from other systems that are present on a user device and interact with the other systems to present results. For example, an on-device speech to text recognizer, a local database present only on-device, or a current status of a user interface, which may not be continuously uploaded to the cloud for bandwidth reasons, may interact with a local semantic parser.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
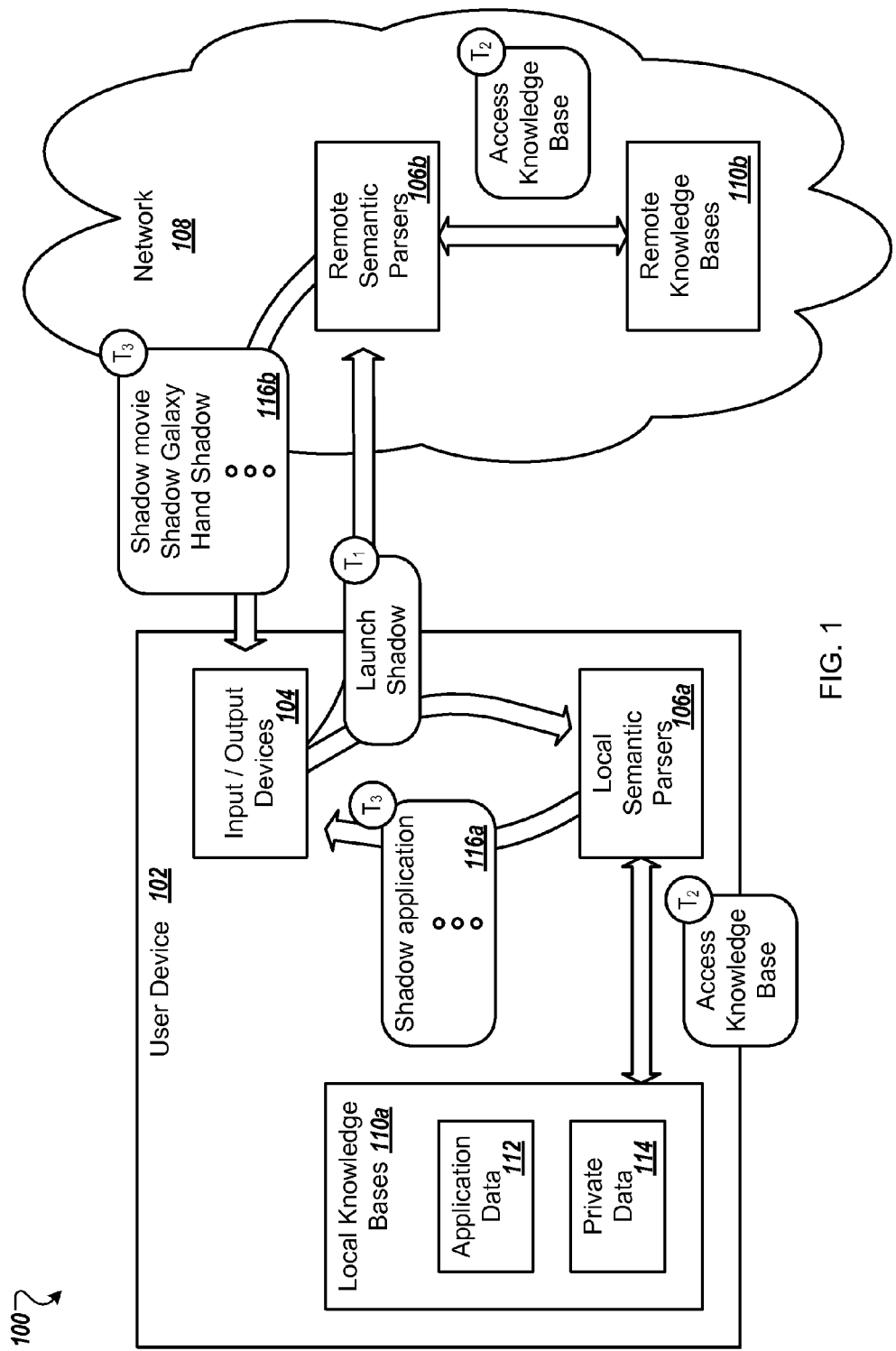
FIG. 1 is an example of a network system for semantic parsing of a user prompt.

A semantic parser may analyze text from a query spoken by a user to determine the meaning of the query, e.g., what the user is searching for. After the analysis the semantic parser may search a knowledge base of data that is associated with the semantic parser to determine data responsive to the user's query.

Sometimes a particular semantic parser may not have access to the specific data that the user requires. For example, the user may request that a device launch a particular application that is installed on the device but that is not available on a network, e.g., when the user is developing the particular application, where a local semantic parser has access to data about the particular application and a remote semantic parser does not have access to data associated with the particular application.

To allow the user to receive the most relevant information based on the user's query, the device provides the query text to multiple semantic parsers that are associated with different knowledge bases where at least some of the data available to one of the semantic parsers is not available to another semantic parser. The device then receives results responsive to the user's query, identifies the most relevant result or results, and provides information associated with the most relevant result or results to the user.

For example, when a user requests that the device "Launch Shadow," the device sends the query to at least a first and a second semantic parser. The semantic parsers determine results responsive to the query by, for example, determining that the user is requesting an application, based on the n-gram "launch," and the name of the application is "Shadow." The semantic parsers search their respective knowledge bases for data responsive to the user's query to determine applications with the name "Shadow" or that include the n-gram "shadow" in their name or other data that may be associated with a Shadow application. The device then receives the results from the semantic parsers, determines which result is most relevant to the user's query, and provides information about the most relevant result to the user. For example, the device executes the Shadow application and presents the user with a user interface associated with the Shadow application.

In some implementations, the device provides the query to a local semantic parser that executes on the device and a remote semantic parser that executes on a different device. For example, some sources of knowledge, e.g., data, are only available to a particular semantic parser, e.g., on the device, and not another semantic parser, e.g., on a remote device, due to privacy or bandwidth reasons. In some examples, a user's contacts are only available to a local parser and not a remote parser. In some examples, a product vendor may store proprietary data, e.g., a shoe catalog, on the device that is not publically available on the Internet, e.g., that cannot be found in response to a query on a search engine.

In some implementations, the device provides the query to two or more semantic parsers that execute on the device. For example, different semantic parsers on the device may have access to data associated with different applications. In some examples, a first semantic parser may have access to the user's contacts and a second semantic parser may have access to data associated with a particular application to ensure that the developer of the application is unable to receive the user's private data, e.g., the contact data, while maintaining the confidentiality of the developer's data.

FIG. 1 is an example of a network system 100 for semantic parsing of a user prompt. For example, a user device 102 receives a spoken prompt from a user, generates a transcription of the prompt, and provides the transcription to two or more semantic parsers each of which are associated with at least some data not available to the other parsers. The semantic parsers determine results responsive to the user prompt and provide the results to the user device 102 and the user device 102 provides information associated with the most relevant result to the user.

The user device 102 includes one or more input and output devices 104. For example, the user device includes multiple keys, e.g., included in a touch screen interface, and a microphone as input devices 104. The microphone allows the user device 102 to receive spoken prompts from a user, such as a prompt to "Launch Shadow."

The user device 102 provides the spoken prompt to a speech to text recognizer, receives a transcription of the spoken prompt, and provides the transcription to one or more local semantic parsers 106a and one or more remote semantic parsers 106b during time $T_1$. For example, the user device 102 connects to the remote semantic parsers 106b with a network 108 and sends the transcription "Launch Shadow" across the network 108 to the remote semantic parsers 106b.

During time $T_2$, each of the local semantic parsers 106a and each of the remote semantic parsers 106b access associated local knowledge bases 110a and remote knowledge bases 110b, respectively, to determine results responsive to the prompt "Launch Shadow." For example, the local semantic parser 106a search data stored in memory of the user device 102 for data associated with a Shadow application and the remote semantic parsers 106b search data stored in one or more servers on the network 108 for data associated with the Shadow application.

In some implementations, the local knowledge bases 110a include application data 112 and private data 114. For example, the application data 112 may be available to a first local semantic parser and none of the other local semantic parsers 106a, and include data about a Shadow application installed on the user device 102. The application data 112 may include application settings, descriptions for one or more applications that are installed on the user device 102 or available to the user device 102, and/or a state of an application, such as a saved game.

The private data 114 may be available to a second semantic parser and none of the other local semantic parsers 106a, and include personal data for a user of the user device 102. The private data 114 may include user contacts, e.g., stored on a subscriber identity module (SIM) card in the user device 102, calendar entries, alarm clock information, network setting information, e.g., for wireless networks to which the user device 102 connects, email stored on the user device 102, and/or web page bookmarks, to name a few examples.

The remote knowledge bases 110b may include data available to a search engine, remote email data, applications available to the user device 102 that may or may not be installed on the user device 102, and/or social networking data, to name a few examples.

In this example, one of the local semantic parsers 106a determines that a Shadow application is installed on the user device 102 based on the application data 112, a first remote semantic parser determines that a Shadow movie is available to the user device 102, and a second remote semantic parser determines that a Shadow Galaxy application and a Hand Shadow application are available to the user device 102.

The user device 102, during time $T_3$, receives local results 116a and remote results 116b from the local semantic parsers 106a and the remote semantic parsers 106b, respectively. For example, the local results 116a include information about the Shadow application installed on the user device 102, in addition to other local results responsive to the prompt "Launch Shadow," and the remote results 116b include information about the Shadow movie, and the Shadow Galaxy and Hand Shadow applications, in addition to other remote results responsive to the prompt "Launch Shadow."

The user device 102 analyzes the local results 116a and the remote results 116b to determine a most relevant result to the prompt "Launch Shadow." For example, the user device 102 determines that the Shadow application is only installed on the user device 102, based on the local results 116a including information about the Shadow application and the remote results 116b not including any information about the Shadow application, that the Shadow application is the most relevant result for the "Launch Shadow" prompt, and executes the Shadow application, presenting the user interface for the Shadow application on a display included in the input and output devices 204.

In this example, the Shadow application may be an application that is in development and not currently available from an application server connected to the network 108. When the user device 102 receives a request to launch the Shadow application and provides text from the request to the local semantic parsers 106a and the remote semantic parsers 106b, at least one of the local semantic parsers 106a determines that the Shadow application is installed on the user device 102 while none of the remote semantic parsers 106b identify a copy of the Shadow application that is available to the user device 102. For example, one of the remote semantic parsers 106b may determine that the user device 102 received an email about the development of the Shadow application but did not locate a copy of the Shadow application that could be installed or launched on the user device 102.

Figure 2:
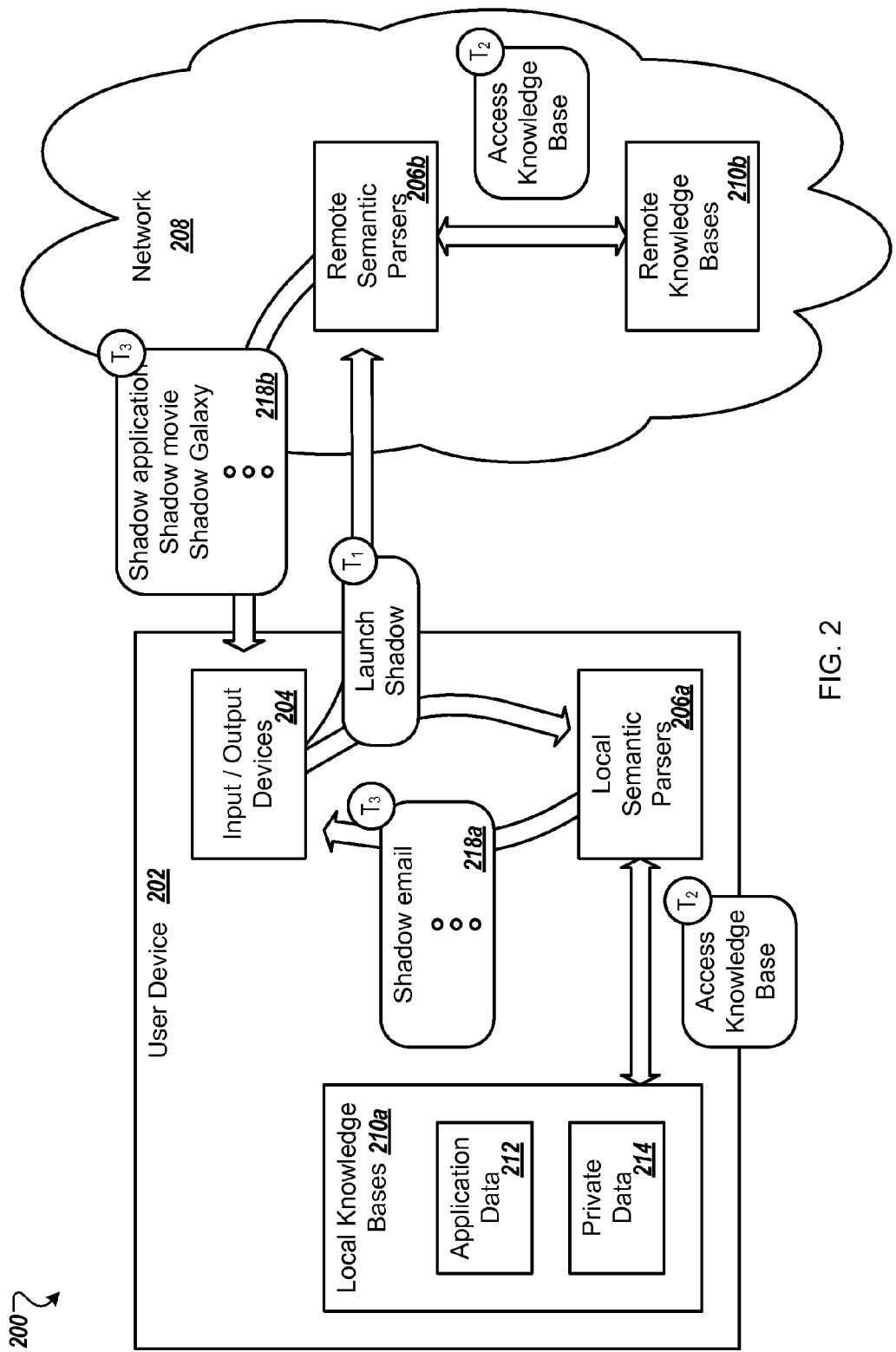
FIG. 2 is another example of a network system for semantic parsing of a user prompt.

FIG. 2 is another example of a network system 200 for semantic parsing of a user prompt. Here the user device 202 does not include a copy of the Shadow application, unlike the user device 102, and the local semantic parsers 206a identify local results 218a, including an email about the Shadow application, in the local knowledge bases 210a during time $T_2$, but do not identify a copy of the Shadow application installed on the user device 202. For example, one of the local semantic parsers 206a determines that the user device 202 received an email, stored in the private data 214, about the Shadow application but does not locate information about the Shadow application in the application data 212.

The remote semantic parsers 206b identify remote results 218b, during time $T_2$, including information about the Shadow application, information about a Shadow movie, and information about a Shadow Galaxy application from the remote knowledge bases 210b. For example, a first remote semantic parser locates the Shadow movie in an associated movie knowledge base, such as a movie archive that includes video files or a movie information database, and a second remote semantic parser locates information about the Shadow and Shadow Galaxy applications in an associated application database.

The user device 202, during time $T_3$, receives the local results 218a and the remote results 218b from the local semantic parsers 206a and the remote semantic parsers 206b, respectively, and determines a most relevant result based on the prompt "Launch Shadow." For example, the user device 202 determines that the user is requesting an application based on the n-gram "launch," that the name of the application includes the n-gram "Shadow," and that the Shadow application is the most relevant result.

In this example, the user device 202 received an email recommending the Shadow application and, after reading the email, a user of the user device 202 requested that the user device 202 "Launch Shadow." The user device 202 then determines that the Shadow application is not installed on the user device 202 based on the local results 218a, and that the Shadow application is available from an application server based on the remote results 218b. The user device 202 may then request a copy of the Shadow application from the application server, download the copy of the Shadow application using the network 208, install the Shadow application on the user device 202, and execute the installed copy of the Shadow application, presenting the user interface for the Shadow application to the user on a display included in the input and output devices 204.

Here the Shadow application was not initially installed on the user device 202 and one of the remote semantic parsers 206b located a copy of the Shadow application that was available to the user device 202 and provided the user device 202 with the most relevant result including information about the Shadow application available from the application server.

In some implementations, the local semantic parsers 206a may not provide the user device 202 with any results. For example, when the local semantic parsers 206a determine that there are not any results responsive to the prompt "Launch Shadow," e.g., when the private data 214 does not include the email about the Shadow application, then the local semantic parsers 206a do not provide the local results 218a to the user device 202.

In some implementations, multiple different knowledge bases include results that are highly responsive to a user prompt. For example, the Shadow application may be installed on the user device 102 and be available to the user device 102 from an application server.

In some examples, different semantic parsers provide the same result to the user device 102 and the user device 102 determines which result to provide to a user. For example, when a local semantic parser and a remote semantic parser provide the user device 102 with the same result, the user device 102 may present information associated with the local result to a user, e.g., by launching a local copy of the Shadow application.

In some implementations, two semantic parsers may identify results that include some of the same data but not all of the same data. For example, a first local semantic parser may determine that a Shadow application is installed on the user device 102 and a second local semantic parser may determine that an update for the Shadow application is available, e.g., based on an email or update notification message. The user device 102 then determines whether to present information about the update to a user or to execute the currently installed version of the Shadow application.

In another example, a local semantic parser may determine that a first version of the Shadow application is installed on the user device 102 and a remote semantic parser may determine that a second version of the Shadow application is available from an application server. The user device 102 may compare information about the different versions to determine which result is more relevant to the user prompt. For example, the user device 102 may determine that application server includes a more recent version of the Shadow application, update the version of the application installed on the user device 102 to the more recent version, and launch the Shadow application. In some examples, the user device 102 may determine that the version of the Shadow application currently installed on the user device 102 is more recent, e.g., when the user device includes a development version of the application, and launch the currently installed version of the Shadow application. Alternatively, the user device 102 may present the user with a prompt asking if the user device 102 should update the application.

Figure 3:
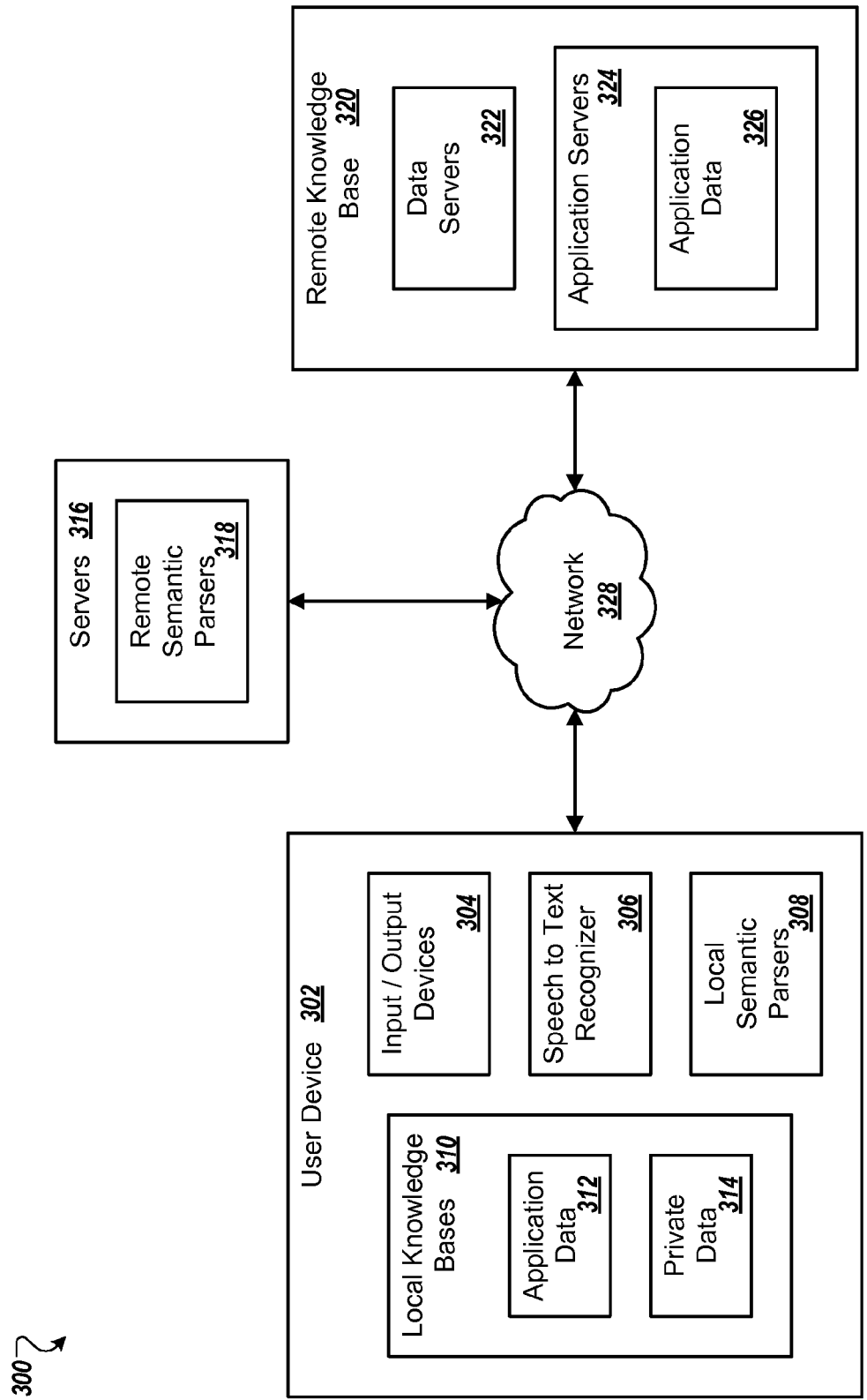
FIG. 3 is a block diagram of an environment in which multiple semantic parsers provide results responsive to a user prompt.

FIG. 3 is a block diagram of an environment 300 in which multiple semantic parsers provide results responsive to a user prompt. The environment 300 includes a user device 302 that receives prompts from a user of the user device 302 using the input and output devices 304. For example, the input and output devices 304 may include a touch screen display that receives input from a touch interface and presents information, such as search results, to a user.

The input and output devices 304 include a microphone that receives a spoken prompt from the user and provides a digital representation of the spoken prompt to a speech to text recognizer 306. The speech to text recognizer 306 generates a transcription of the spoken prompt, for example, by transcribing the words in the spoken prompt into one or more transcribed prompt n-grams.

The user device 302 provides the transcription of the spoken prompt to one or more local semantic parsers 308 that access one or more local knowledge bases 310 to determine data responsive to the spoken prompt. For example, one of the local semantic parsers 308 may access local application data 312 to determine search results responsive to the spoken prompt. In some examples, the same local semantic parser or another local semantic parser 308 may access private data 314 to determine search results responsive to the spoken prompt.

One or both of the local application data 312 and the private data 314 include data that is not available to one or more remote semantic parsers 318 that execute on one or more servers 316. For example, the private data 314 may include user contact information that is not stored in a remote knowledge base 320 accessible to the remote semantic parsers 318 and is not otherwise available to the remote semantic parsers 318.

The remote knowledge base 320 includes one or more data servers 322 that store data available to a user through a network 328. For example, the data servers 322 may include one or more web servers that can provide web pages to the user device 302. The data servers 322 may include email servers, file sharing servers, instant messaging servers, and/or online gaming servers, to name a few examples.

One or more application servers 324 store applications that are available to the user device 302. For example, the user device 302 may present a user with information about one of the applications stored on the application servers 324 to allow the user to request installation of the application on the user device 302. The application servers 324 include application data 326 about the applications stored on the application servers 324. For example, the application data 326 may include a description of each of the applications stored on the application servers 324 and the user device 302 may present a user with the description for a particular application in response to receiving user input requesting information for the particular application.

When the remote semantic parsers 318 receive the transcription of the spoken prompt from the user device 302, the remote semantic parsers 318 search the data servers 322 and the application data 326 for data responsive to the spoken prompt and provide results to the user device 302. For example, upon receiving a user prompt "Launch Shadow," a first remote semantic parser may search an email database on one of the data servers 322 for email messages responsive to the user prompt and a second remote semantic parser may search the application data 326 for applications responsive to the user prompt, in addition to other remote semantic parsers 318 searching other knowledge bases or other portions of the remote knowledge base 320.

Upon receiving the results from the local semantic parsers 308 and the remote semantic parsers 318, the user device 302 determines which results are most responsive to the user prompt "Launch Shadow" and presents information associated with the most responsive results to the user with the input and output devices 304. For example, the user device 302 may provide the user with a prompt asking whether to install an update for the Shadow application prior to launching the Shadow application. The prompt may be visual, e.g., presented on the touch screen display, or verbal, e.g., an audible prompt. In some examples, the user device 302 executes the Shadow application and presents a user interface for the Shadow application on the input and output devices 304.

The user device 302 may include a personal computer, a mobile communication device, and other devices that can send and receive data over the network 328. The network 328, such as a local area network (LAN), wide area network (WAN), the Internet, or a combination thereof, connects the user device 302, the servers 316, and the remote knowledge base 320.

In some implementations, one of the semantic parsers has a more complete view of data stored on the user device 302 than the other semantic parsers. For example, a particular local semantic parser 308 may have access to data about a user's contacts, preferences, bookmarks, browsing history, databases accessed, such as various knowledge sources, and calendar entries, among other private data 314, and provide results responsive to a user prompt based on the private data 314 while maintaining the confidentiality of the private data 314, i.e., without providing any of the private data 314 to another device such as the servers 316. In some examples, a particular remote semantic parser may have access to data, such as social network contacts, that other remote and local semantic parsers cannot access.

In some implementations, a local semantic parser on the user device 302 has a more complete view of the data on the user device 302 and accessed by the user device 302. For example, the local semantic parser may have knowledge about a user's browsing history, email, and applications, all of which are stored in the remote knowledge base 320, where none of the remote semantic parsers 318 is able to determine that the user's browsing history, email, and applications are all associated with the user device 302. The local semantic parser may use the user's browsing history, email, and application data to determine more relevant results that are responsive to a user prompt than would otherwise be identified, or to determine that a specific result is the most relevant result for a particular user prompt where the specific result may not be identified as the most relevant otherwise.

For example, a remote semantic parser may identify a large number of results from the remote knowledge base 320 that are potentially responsive to a user prompt, e.g., where many of the results may be false positives, while the local semantic parser is able to identify the particular result, which may be one of the many results identified by the remote semantic parser, for which the user is looking. The user device 302 may then provide the particular result to the user in an easily identifiable manner, e.g., at the top of a results list rather than buried in the large number of results received from the remote semantic parser.

In some implementations, the environment 300 has different semantic parsers for different users. For example, a first semantic parser may be associated with a first user and a second semantic parser may be associated with a second user. When the first user provides the user device 302 with a prompt, the first semantic parser searches first data associated with the first user to determine results responsive to the prompt. If the second user provides the same prompt to the user device 302, the second semantic parser searches second data associated with the second user to determine results responsive to the prompt.

The results presented to the second user may be the same as the results presented to the first user depending on the second data associated with the second user that is different from the first data. For example, if the only data not included in both the first data and the second data includes user preference data, and the prompt submitted by both the first user and the second user is "Launch Shadow," then the user device 302 may present both users with information about the Shadow application. If, however, the prompt submitted by both users was "What time is my alarm?" then the results presented to the first user and the second user may be different depending on the alarms associated with the users.

In these implementations, the different semantic parsers may both be local semantic parsers, e.g., executing on the user device 302, or remote semantic parsers, or one of the semantic parsers may be local while the other is a remote semantic parser.

In certain implementations, the user device 302 provides a user prompt to some of the semantic parsers before providing the user prompt to other semantic parsers. For example, the user device 302 may provide the user prompt to the local semantic parsers 308 and then, depending on the results received from the local semantic parsers 308, provide the user prompt to the remote semantic parsers 318. For example, if the local semantic parsers 308 do not provide the user device 302 with any results or results with low relevance scores, the user device 302 may provide the user prompt to the remote semantic parsers 318. In some examples, the user device 302 provides a user prompt to a general semantic parser that does not have access to the local application data 312 and/or the private data 314 before providing the user prompt to another local semantic parser 308.

In some implementations, the local application data 312 includes user interface data, such as an option interface dialog presented on a display. In these implementations, the user device 302 may receive input from the user indicating selection of one of the options, such as selection of "Yes, install the updated application," from the user and a local semantic parser, associated with the user interface, may determine the correct action to take without uploading user interface data and the data representing the user selection to one of the servers 316. Analysis of the user selection and the local application data 312 locally may reduce the latency of the action taken by the user device 302 in response to the user selection.

Figure 4:
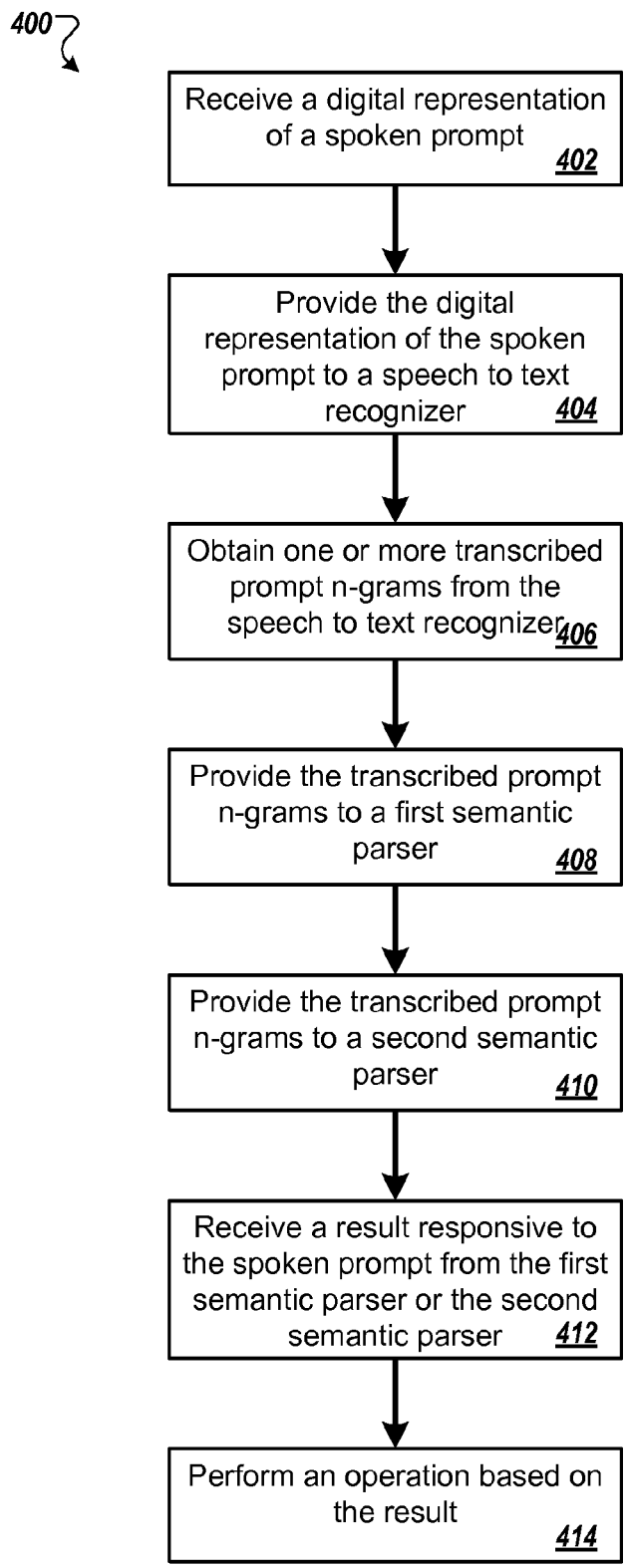
FIG. 4 is a flow diagram of a process for determining an operation responsive to a prompt.

FIG. 4 is a flow diagram of a process 400 for determining an operation responsive to a prompt. The process 400 can be used by the user device 302 from the environment 300.

The user device receives a digital representation of a spoken prompt (402). For example, a microphone included in the user device records the digital representation of the spoken prompt. The spoken prompt may include a request for the user device to perform a specific action, such as "Launch Shadow" or a query for data, such as "How much does the Shadow application cost?"

The user device provides the digital representation of the spoken prompt to a speech to text recognizer (404). For example, the user device provides a digital representation of "Launch Shadow" to the speech to text recognizer.

In some implementations, the speech to text recognizer executes on the user device. In some implementations, the speech to text recognizer executes on another device.

The user device obtains one or more transcribed prompt n-grams from the speech to text recognizer (406). The transcribed prompt n-grams are based on the digital representation of the spoken prompt. For example, the speech to text recognizer determines the n-grams included in the prompt "Launch Shadow," e.g., the n-grams "launch" and "shadow," and provides the n-grams to the user device.

The speech to text recognizer maintains the order of the n-grams when providing the n-grams to the user device. For example, the speech to text recognizer provides the n-grams to the user device in the same order that the microphone recorded the n-grams.

The user device provides the transcribed prompt n-grams to a first semantic parser (408). The first semantic parser executes on the user device and accesses a first knowledge base for results responsive to the spoken prompt. The first knowledge base is stored in a memory of the user device. For example, the user device provides the n-grams "Launch Shadow" to the first local semantic parser and the first local semantic parser searches the first local knowledge base for data responsive to the prompt "Launch Shadow."

The user device provides the transcribed prompt n-grams to a second semantic parser (410). The second semantic parser accesses a second knowledge base for results responsive to the spoken prompt. For example, the user device provides the n-grams "Launch Shadow" to the second semantic parser.

The local first knowledge base includes first data not included in the second knowledge base. For example, the first data may include private user data stored in the memory of the user device where the second semantic parser does not have access to the private user data. In some examples, the second knowledge base includes email data associated with the user device and the first knowledge base includes application data that indicates the applications installed on the user device.

In some implementations, the second knowledge base includes second data not included in the first knowledge base. For example, the first knowledge based does not include the email data included in the second knowledge base. In some example, both the first knowledge base and the second knowledge base include some of the same data. In some examples, the first knowledge base includes all of the data that is in the second knowledge base.

In some implementations, the second semantic parser executes on the user device and the second knowledge base is stored in the memory of the user device. For example, email data is stored on the user device.

In some implementations, the second semantic parser executes on a server and the second knowledge base is stored in one or more remote computers. For example, the email data is stored on an email server and is associated with the user device.

The user device receives a result responsive to the spoken prompt from the first semantic parser or the second semantic parser (412). The semantic parser that provides the result to the user device selects the result from the knowledge base associated with the semantic parser. For example, the user device receives a first result from the first semantic parser that identifies the Shadow application that is installed on the user device. In some examples, the user device receives a second result from the second semantic parser that identifies the price of the Shadow application where the price is retrieved from an application server that stores data associated with the Shadow application.

The user device performs an operation based on the result (414). For example, when the prompt is a request for the user device to perform a specific action, such as "Launch Shadow," the user device executes the Shadow application and presents a user interface associated with the Shadow application.

In some examples, when the prompt is a query for data, such as "How much does the Shadow application cost?" the user device provides the user with the price of the Shadow application, e.g., in a visual or verbal response.

The order of steps in the process 400 described above is illustrative only, and determining the operation responsive to the prompt can be performed in different orders. For example, the user device may provide the transcribed prompt n-grams to the second semantic parser prior to providing the transcribed prompt n-grams to the first semantic parser.

In certain implementations, the user device performs an operation based on the received result prior to receiving a result from the other semantic parser. For example, the user device may perform the operation based on the second result prior to receiving a first result from the first semantic parser. Alternatively, the user device may perform the operation based on the first result prior to receiving a second result from the second semantic parser.

In some implementations, the process 400 can include additional steps, fewer steps, or some of the steps can be divided into multiple steps. For example, the user device may provide the transcribed prompt n-grams to the first semantic parser and the second semantic parser in the same step.

In some implementations, the user device provides prompt n-grams to the first semantic parser and the second semantic parser, receives the result responsive to the prompt, and performs an operation based on the result without transcribing the prompt. For example, when the prompt includes input received by one or more keys on the user device, the user device does not obtain a transcription of the prompt.

Figure 5:
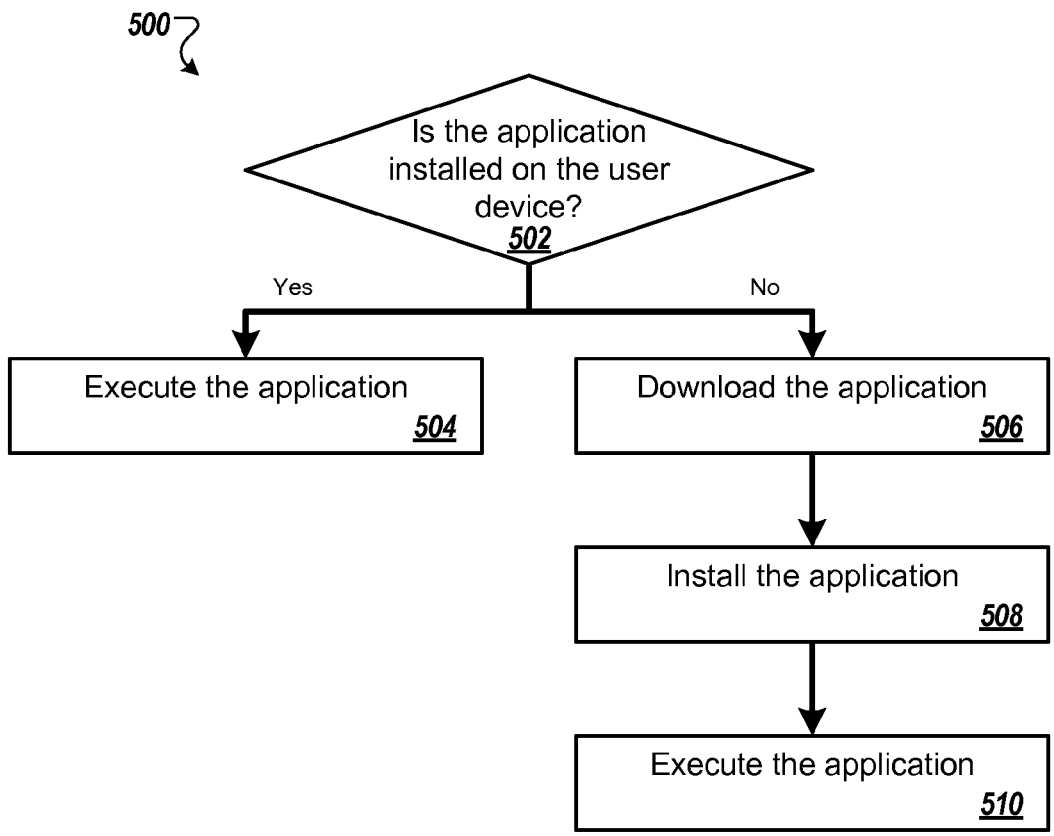
FIG. 5 is a flow diagram of a process for executing an application.

FIG. 5 is a flow diagram of a process 500 for executing an application. The process 500 can be used by the user device 302 from the environment 300.

The user device determines whether the application is installed on the user device (502). For example, when the user device receives a result that includes the name of an application from the first semantic parser or the second semantic parser, the user device determines whether the application is installed on the user device.

Based on determining that the application is installed on the user device, the user device executes the application (504). For example, the user device presents a user with a user interface associated with the application. The user device may determine that the application is installed on the user device based on receiving a result from a local semantic parser.

In some implementations, when the application is already running on the user device, the user device switches to the application. For example, the user device determines that the application is running on the user device but is currently minimized and the user device maximizes the application, presenting the user with a user interface associated with the application.

In some implementations, when a first instance of the application is already running on the user device, the user device launches a second instance of the application. For example, the user device determines based on one or more settings associated with the application that the second instance of the application should be launched and that the first instance of the application should not be presented to a user.

Based on determining that the application is not installed on the user device, the user device downloads the application (506). For example, the user device downloads the application from an application server.

In some implementations, the user device determines that the application is not installed on the user device based on receiving the name of the application from a remote semantic parser when the remote semantic parser executes on a server. For example, the user device determines that if the application were installed on the user device, the local semantic parser would have provided the same result, or information associated with the same application, to the user device, but since the local semantic parser did not find the name of the application in the first knowledge base, the application is not currently installed on the user device.

The user device installs the application (508). For example, the user device installs the application in a memory included in the user device.

The user device executes the application (510). For example, the user device executes the application as described above with reference to step 504.

In some implementations, the process 500 can include additional steps, fewer steps, or some of the steps can be divided into multiple steps. For example, the user device may download and install the application in the same step.

Figure 6:
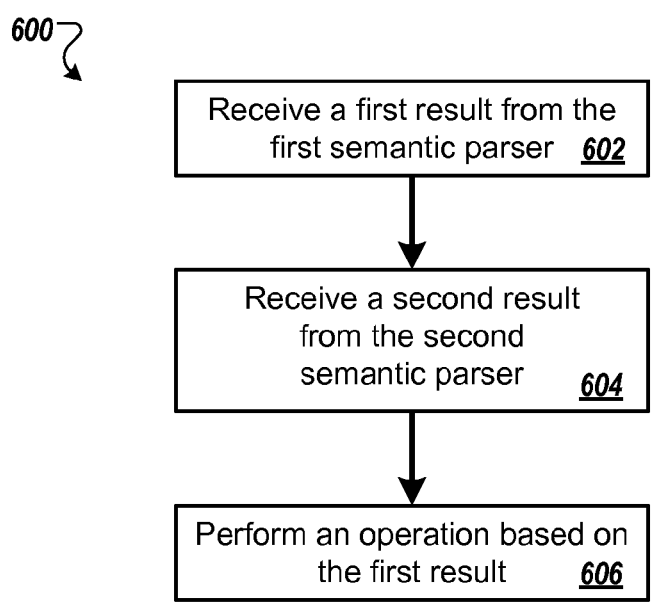
FIG. 6 is a flow diagram of a process for performing an operation based on a first result.

FIG. 6 is a flow diagram of a process 600 for performing an operation based on a first result. The process 600 can be used by the user device 302 from the environment 300.

The user device receives a first result from a first semantic parser (602). The first semantic parser executes on the user device and accesses a first knowledge base for results responsive to a spoken prompt. The first semantic parser selects the first result from the first knowledge base such that the first result is responsive to the spoken prompt. For example, the user device provides the first semantic parser with a prompt that includes a contact's name, and receives contact information from the first semantic parser.

The user device receives a second result from a second semantic parser (604). The second semantic parser accesses a second knowledge base for results responsive to the spoken prompt. The second semantic parser selects the second result from the second knowledge base such that the second result is responsive to the spoken prompt. For example, the user device also provided the second semantic parser with the prompt, and receives different contact information from the second semantic parser.

The user device performs an operation based on the first result (606). For example, the user device initiates a call with the contact based on the contact information received from the first semantic parser.

The order of steps in the process 600 described above is illustrative only, and performing the operation based on the first result can be performed in different orders. For example, the user device may receive the second result prior to receiving the first result.

In these implementations, the user device may perform the operation using the first result based on determining that the second semantic parser executes on a server and/or the second result has a lower priority than the first result. For example, the user device may determine that the contact information received from the first semantic parser is more likely to be up to date than the contact information received from the second semantic parser based on the knowledge bases available to the semantic parsers. In one example, contact information received from the Internet may not be as up to date as contact information a user entered into the user device.

In some examples, the user device may determine that contact information received from the Internet is more recent based on a "last updated" property associated with the contact information. In these examples, the first semantic parser may not execute on the user device but may execute on another device.

In some implementations, the process 600 can include additional steps, fewer steps, or some of the steps can be divided into multiple steps. For example, the user device may perform the operation based on the first result upon determining that the second result was received after the first result.

In certain implementations, the user device may perform the operation based on the first result prior to receiving the second result. For example, the user device may determine that the first result is relevant to the user prompt and present information associated with the first result or take action based on the first result prior to receiving the second result.

If the user device later receives the second result, the user device may update a results list presented to the user, prompt the user to determine whether to present the second result to the user, e.g., along with the first result, or take no action. For example, the user device may determine that the first result is more relevant than the second result and not present the second result to the user.

The delay in the receipt of the second result may be caused by high network latency, or the size of the knowledge base associated with the second semantic parser, to name a few examples. For example, the first knowledge base may be much smaller than the second knowledge base such that the first semantic parser returns the first result to the user device before the second semantic parser finishes searching the second knowledge base for responsive results.

Figure 7:
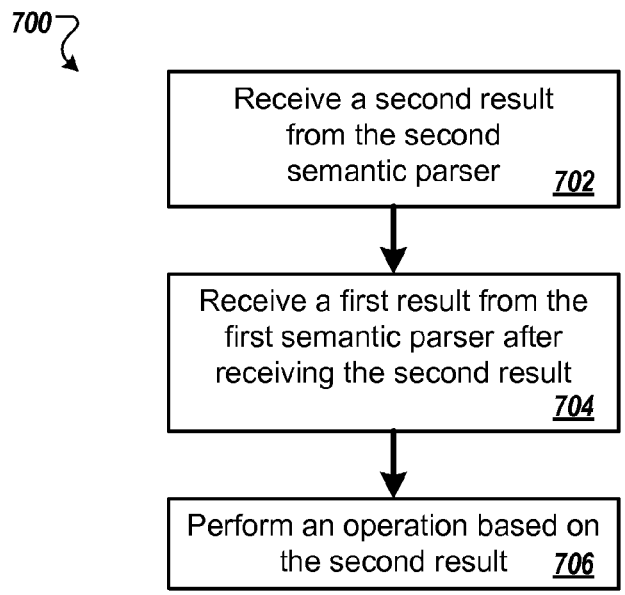
FIG. 7 is a flow diagram of a process for performing an operation based on a second result.

FIG. 7 is a flow diagram of a process 700 for performing an operation based on a second result. The process 700 can be used by the user device 302 from the environment 300.

The user device receives a second result from a second semantic parser (702). The second semantic parser accesses a second knowledge base for results responsive to the spoken prompt. The second semantic parser selects the second result from the second knowledge base such that the second result is responsive to the spoken prompt.

In some implementations, the second semantic parser executes on a separate device from the user device. In these implementations, the separate device or one or more different devices store the second knowledge base in memory.

The user device receives a first result from a first semantic parser after receiving the second result (704). The first semantic parser executes on the user device and accesses a first knowledge base for results responsive to the spoken prompt. The first semantic parser selects the first result from the first knowledge base such that the first result is responsive to the spoken prompt.

The user device performs an operation based on the second result (706). For example, the user device performs the operation based on determining that the second result was received prior to the first result.

The order of steps in the process 700 described above is illustrative only, and performing the operation based on the second result can be performed in different orders. For example, the user device may perform the operation based on the second result prior to receiving the first result from the first semantic parser. In these implementations, the user device may not receive the first result. For example, if the first semantic parser does not identify any data responsive to the prompt in the first knowledge base, the user device does not receive any results from the first semantic parser.

In some implementations, the process 700 can include additional steps, fewer steps, or some of the steps can be divided into multiple steps. For example, the user device may not receive the first result from the first semantic parser.

Figure 8:
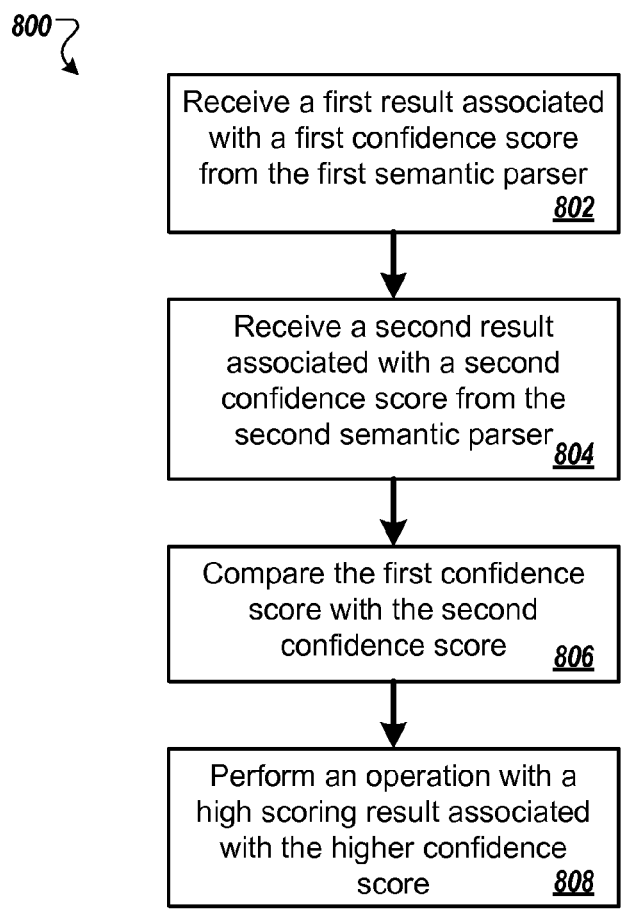
FIG. 8 is a flow diagram of a process for executing an operation for a higher scoring result.

FIG. 8 is a flow diagram of a process 800 for executing an operation for a higher scoring result. The process 800 can be used by the user device 302 from the environment 300.

The user device receives a first result associated with a first confidence score from a first semantic parser (802). The first semantic parser executes on the user device and accesses a first knowledge base for results responsive to a spoken prompt. The first semantic parser selects the first result from the first knowledge base in response to the spoken prompt.

For example, the first semantic parser selects the first result from the first knowledge base and determines the first confidence score based on the probability that the first result is the result for which a user of the user device is looking. In one example, when the user device receives the prompt "Launch Shadow" and the first semantic parser identifies an application with the name "Shadow," the first semantic parser associates a high confidence score with the Shadow application based on the n-gram "launch" being associated with applications and the name of the application matching the n-gram "shadow."

The user device receives a second result associated with a second confidence score from the second semantic parser (804). The second semantic parser selects the second result from the second knowledge base in response to the spoken prompt.

For example, the second semantic parser identifies a movie with the name "Shadow" and an application with the name "Shadow Galaxy" and associates confidence scores with each of the results. In this example, the Shadow movie result has a lower confidence score than the confidence score for the Shadow application result, identified by the first semantic parser, based on the n-gram "launch" typically being associated with applications rather than movies. For example, the second semantic parser may determine that movies are typically identified by the n-gram "play," e.g., associated with a prompt of "Play Shadow."

Continuing the example, the second semantic parser associates the Shadow Galaxy application with a lower confidence score than the confidence score for the Shadow application result, identified by the first semantic parser, based on the name of the Shadow application being an exact match for the n-gram "shadow" where the name of the Shadow Galaxy application is not an exact match.

The user device compares the first confidence score with the second confidence score (806). For example, the user device determines which confidence score is higher. Continuing the example from step 804, the user device determines that the confidence score associated with the Shadow application is greater than the other confidence scores, e.g., associated with the Shadow movie and the Shadow Galaxy application.

The user device performs an operation with a higher scoring result associated with the higher confidence score (808). The user device selects the higher scoring result from the first result and the second result based on the comparing such that the higher scoring result is associated with the higher confidence score. For example, here the user device receives three results and launches the Shadow application based on the Shadow application having the highest confidence score.

In another example, where the Shadow application is not installed on the user device but is stored in an application server and the Shadow movie and the Shadow Galaxy application are stored in the user device, the user device may determine that the Shadow application is associated with the highest confidence score and request the Shadow application from the application server. In this example, the user device would install and launch the Shadow application.

In some examples, if the user device received the prompt "Find the Shadow game" where the Shadow application is not installed on the user device, the user device may present information associated with the Shadow application to the user. For example, the user device may present the name of the application, an application rating, an application description, and/or an application price.

The order of steps in the process 800 described above is illustrative only, and executing the operation for the higher scoring result can be performed in different orders. For example, the user device may receive the second result prior to receiving the first result.

In some implementations, the process 800 can include additional steps, fewer steps, or some of the steps can be divided into multiple steps. For example, the user device may receive multiple results from a single semantic parser. For example, a first semantic parser may provide the user device with eleven results and a second semantic parser may provide the user device with sixty-three results. In these implementations, the user device may present a user with a subset of the received results. For example, the user device may determine the most relevant results based on the confidence scores and present the most relevant results to a user.

In some implementations, when the higher confidence score is not greater than a threshold value, the user device presents two or more results to a user. For example, the user device determines that three results are most relevant to the user prompt, where each of the three results has a confidence score greater than a lower threshold value and none of the three results has a confidence score greater than a higher threshold value, and presents information associated with all three results to the user.

In some implementations, different applications installed on the user device or different tasks for the user device may be associated with different semantic parsers. For example, a calendar application or task, e.g., where a calendar is part of a larger application, may be associated with a first semantic parser, a Shadow application may be associated with a second semantic parser, a Shadow Galaxy application may be associated with a third semantic parser, and so on. Each of the semantic parsers may be a local semantic parser or a remote semantic parser and is associated with data relevant to the particular application, task, or tasks. For example, the Shadow application semantic parser may have access to settings and application data for the Shadow application, and the calendar semantic parser may have access to a user's appointments and contacts to determine whether a user has a conflict at a particular time and what email address to send a meeting request to for a particular contact.

In some implementations, when the user device presents a first application to a user and receives a user prompt associated with a different application or task, the user device provides the user prompt to a semantic parser associated with the different application or task. For example, when a user is viewing email in an email application and prompts the user device to "add a calendar entry . . . ," a calendar semantic parser may determine the most relevant action to perform based on the user prompt, when compared to the relevance of the results received by the user device from other semantic parsers for the user prompt, and provide information associated with the most relevant action to the user device, e.g., such that the user device performs the determined action.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 9:
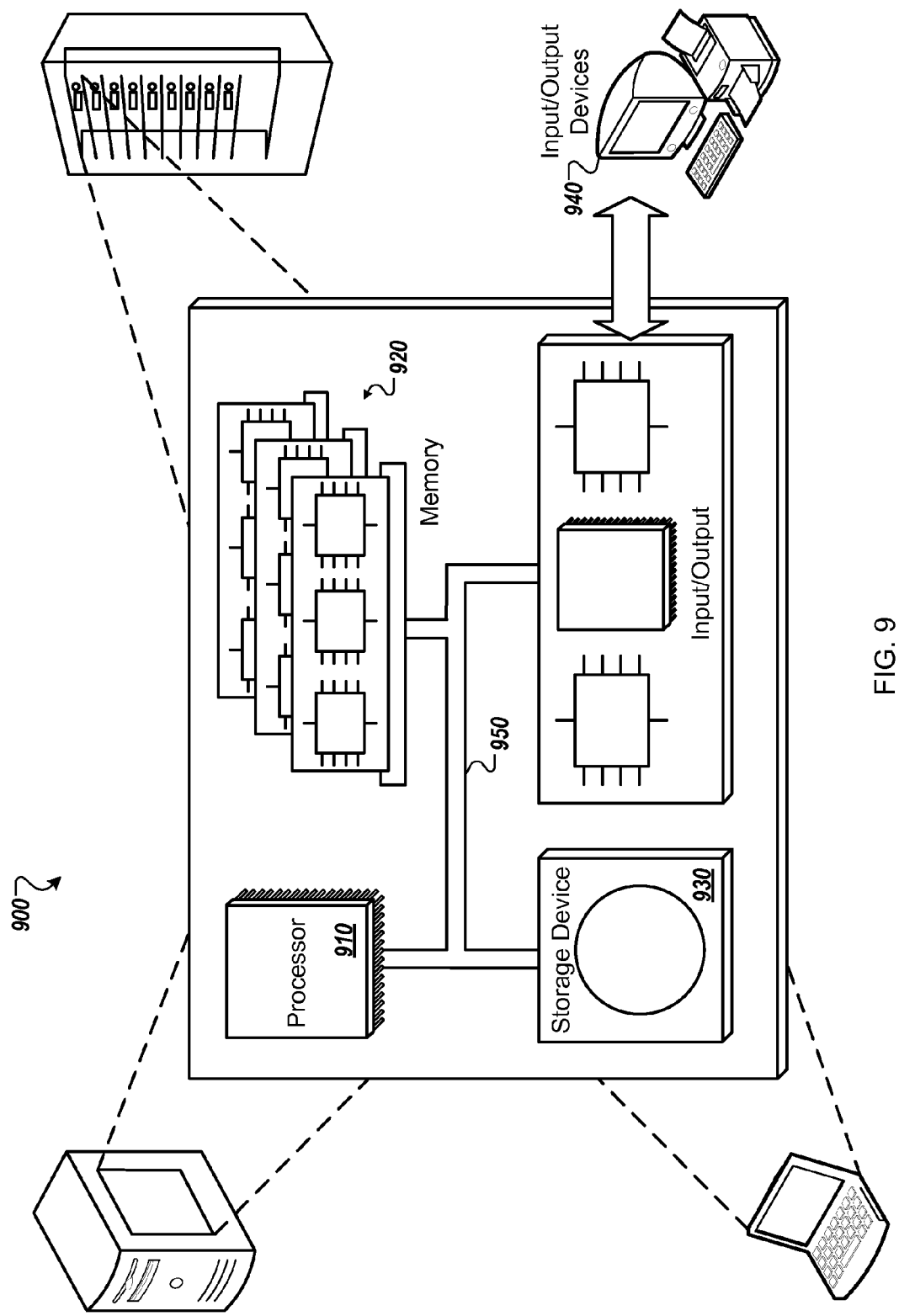
FIG. 9 is a block diagram of a computing system that can be used in connection with computer-implemented methods described in this document.

An example of one such type of computer is shown in FIG. 9, which shows a schematic diagram of a generic computer system 900. The system 900 can be used for the operations described in association with any of the computer-implement methods described previously, according to one implementation. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving, at a user device, a digital representation of a spoken prompt;
   providing, by the user device, the digital representation of the spoken prompt to a speech to text recognizer;
   obtaining, by the user device, one or more transcribed prompt n-grams from the speech to text recognizer based on the digital representation of the spoken prompt;
   providing, by the user device, the transcribed prompt n-grams to a first semantic parser that executes on the user device and accesses a first knowledge base for results responsive to the spoken prompt, the first knowledge base stored in a memory of the user device;
   providing, by the user device, the transcribed prompt n-grams to a second semantic parser that accesses a second knowledge base for results responsive to the spoken prompt, the first knowledge base including first data not included in the second knowledge base;
   receiving, by the user device, a result responsive to the spoken prompt from the first semantic parser or the second semantic parser, wherein the result is selected from the knowledge base associated with the semantic parser that provided the result to the user device; and
   performing, by the user device, an operation based on the result.

2. The method of claim 1, wherein the second semantic parser executes on the user device and the second knowledge base is stored in the memory of the user device.

3. The method of claim 1, wherein the second semantic parser executes on a server and the second knowledge base is stored in one or more remote computers, the server and the remote computers different from the user device.

4. The method of claim 3, wherein the first data comprises private user data stored in the memory of the user device and the second semantic parser does not have access to the private user data.

5. The method of claim 3, wherein the result comprises the name of an application;
   the method further comprising determining, by the user device, that the application is not installed on the user device based on receiving the result from the second semantic parser;
   wherein performing the operation based on the result comprises:
      downloading, by the user device, the application from an application server based on determining that the application is not installed on the user device;
      installing, by the user device, the application; and
      executing, by the user device, the application.

6. The method of claim 1, wherein the result comprises the name of an application;
   the method further comprising determining, by the user device, that the application is installed on the user device;
   wherein performing the operation based on the result comprises executing, by the user device, the application based on determining that the application is installed on the user device.

7. The method of claim 1, wherein:
   receiving the result responsive to the spoken prompt comprises:
      receiving, by the user device, a first result from the first semantic parser, the first result selected from the first knowledge base and responsive to the spoken prompt; and
      receiving, by the user device, a second result from the second semantic parser after receiving the first result, the second result selected from the second knowledge base and responsive to the spoken prompt; and
   performing the operation based on the result comprises performing an operation based on the first result.

8. The method of claim 1, wherein:
   receiving the result responsive to the spoken prompt comprises:
      receiving, by the user device, a first result from the first semantic parser, the first result selected from the first knowledge base, responsive to the spoken prompt, and associated with a first confidence score;
      receiving, by the user device, a second result from the second semantic parser, the second result selected from the second knowledge base, responsive to the spoken prompt, and associated with a second confidence score; and
      comparing, by the user device, the first confidence score with the second confidence score to determine which confidence score is higher; and
   performing the operation based on the result comprises performing an operation with a higher scoring result selected from the first result and the second result based on the comparing, the higher scoring result associated with the higher confidence score.

9. A computer storage medium encoded with instructions that, when executed by a user device, cause the user device to perform operations comprising:
   receiving, by the user device, a digital representation of a spoken prompt;
   providing, by the user device, the digital representation of the spoken prompt to a speech to text recognizer;

obtaining, by the user device, one or more transcribed prompt n-grams from the speech to text recognizer based on the digital representation of the spoken prompt;

providing, by the user device, the transcribed prompt n-grams to a first semantic parser that executes on the user device and accesses a first knowledge base for results responsive to the spoken prompt, the first knowledge base stored in a memory of the user device;

providing, by the user device, the transcribed prompt n-grams to a second semantic parser that accesses a second knowledge base for results responsive to the spoken prompt, the first knowledge base including first data not included in the second knowledge base;

receiving, by the user device, a result responsive to the spoken prompt from the first semantic parser or the second semantic parser, wherein the result is selected from the knowledge base associated with the semantic parser that provided the result to the user device; and performing, by the user device, an action based on the result.

10. The computer storage medium of claim 9, wherein providing the transcribed prompt n-grams to the second semantic parser comprises sending the transcribed prompt n-grams to a server that executes the second semantic parser, wherein the second knowledge base is stored in one or more remote computers, the server and the remote computers different from the user device.

11. The computer storage medium of claim 10, wherein the result comprises the name of an application;

the operations further comprising determining, by the user device, that the application is not installed on the user device based on receiving the result from the second semantic parser;

wherein performing the action based on the result comprises:
  downloading, by the user device, the application from an application server based on determining that the application is not installed on the user device;
  installing, by the user device, the application; and
  executing, by the user device, the application.

12. The computer storage medium of claim 9, wherein the result comprises the name of an application;

the operations further comprising determining, by the user device, that the application is installed on the user device;

wherein performing the action based on the result comprises executing, by the user device, the application based on determining that the application is installed on the user device.

13. The computer storage medium of claim 9, wherein:
receiving the result responsive to the spoken prompt comprises:
  receiving, by the user device, a first result from the first semantic parser, the first result selected from the first knowledge base and responsive to the spoken prompt; and
  receiving, by the user device, a second result from the second semantic parser after receiving the first result, the second result selected from the second knowledge base and responsive to the spoken prompt; and
performing the action based on the result comprises performing an operation based on the first result.

14. The computer storage medium of claim 9, wherein:
receiving the result responsive to the spoken prompt comprises:
  receiving, by the user device, a first result from the first semantic parser, the first result selected from the first knowledge base, responsive to the spoken prompt, and associated with a first confidence score;
  receiving, by the user device, a second result from the second semantic parser, the second result selected from the second knowledge base, responsive to the spoken prompt, and associated with a second confidence score; and
  comparing, by the user device, the first confidence score with the second confidence score to determine which confidence score is higher; and
performing the action based on the result comprises performing an action with a higher scoring result selected from the first result and the second result based on the comparing, the higher scoring result associated with the higher confidence score.

15. A system comprising:
a user device and one or more storage devices storing instructions that are operable, when executed by the user device, to cause the user device to perform operations comprising:
  receiving, by the user device, a digital representation of a spoken prompt;
  providing, by the user device, the digital representation of the spoken prompt to a speech to text recognizer;
  obtaining, by the user device, one or more transcribed prompt n-grams from the speech to text recognizer based on the digital representation of the spoken prompt;
  providing, by the user device, the transcribed prompt n-grams to a first semantic parser that executes on the user device and accesses a first knowledge base for results responsive to the spoken prompt, the first knowledge base stored in a memory of the user device;
  providing, by the user device, the transcribed prompt n-grams to a second semantic parser that accesses a second knowledge base for results responsive to the spoken prompt, the first knowledge base including first data not included in the second knowledge base;
  receiving, by the user device, a result responsive to the spoken prompt from the first semantic parser or the second semantic parser, wherein the result is selected from the knowledge base associated with the semantic parser that provided the result to the user device; and
  performing, by the user device, an action based on the result.

16. The system of claim 15, wherein the second semantic parser executes on a server and the second knowledge base is stored in one or more remote computers, the server and the remote computers different from the user device.

17. The system of claim 16, wherein the first data comprises private user data stored in the memory of the user device and the second semantic parser does not have access to the private user data.

18. The system of claim 16, wherein the result comprises the name of an application;

the operations further comprising determining, by the user device, that the application is not installed on the user device based on receiving the result from the second semantic parser;

wherein performing the action based on the result comprises:
  downloading, by the user device, the application from an application server based on determining that the application is not installed on the user device;

installing, by the user device, the application; and
executing, by the user device, the application.

19. The system of claim 15, wherein the result comprises the name of an application;
the operations further comprising determining, by the user device, that the application is installed on the user device;
wherein performing the action based on the result comprises executing, by the user device, the application based on determining that the application is installed on the user device.

20. The system of claim 15, wherein:
receiving the result responsive to the spoken prompt comprises:
receiving, by the user device, a first result from the first semantic parser, the first result selected from the first knowledge base, responsive to the spoken prompt, and associated with a first confidence score;
receiving, by the user device, a second result from the second semantic parser, the second result selected from the second knowledge base, responsive to the spoken prompt, and associated with a second confidence score; and
comparing, by the user device, the first confidence score with the second confidence score to determine which confidence score is higher; and
performing the action based on the result comprises performing an action with a higher scoring result selected from the first result and the second result based on the comparing, the higher scoring result associated with the higher confidence score.

21. The computer storage medium of claim 9, wherein the second semantic parser executes on the user device and the second knowledge base is stored in the memory of the user device.

22. The computer storage medium of claim 10, wherein the first data comprises private user data stored in the memory of the user device and the second semantic parser does not have access to the private user data.

23. The system of claim 15, wherein the second semantic parser executes on the user device and the second knowledge base is stored in the memory of the user device.

24. The system of claim 16, wherein the first data comprises private user data stored in the memory of the user device and the second semantic parser does not have access to the private user data.

* * * * *